United States Patent

Wingard

[11] Patent Number: 6,139,031
[45] Date of Patent: Oct. 31, 2000

[54] SNOW SCOOTER

[76] Inventor: Steve Griffith Wingard, 1905 W. 4700 South, #207, Salt Lake City, Utah 84118

[21] Appl. No.: 09/292,084

[22] Filed: Apr. 14, 1999

Related U.S. Application Data

[60] Provisional application No. 60/081,907, Apr. 16, 1998.

[51] Int. Cl.[7] ................................................. B62B 13/14
[52] U.S. Cl. .................................. 280/14.28; 280/28.11; 280/21.1
[58] Field of Search ............................. 280/14.2, 14.3, 280/87.041, 87.042, 87.043, 87.03, 87.05, 87.01, 87.021, 16, 28.11, 21.1

[56] References Cited

U.S. PATENT DOCUMENTS

| | | | |
|---|---|---|---|
| 89,021 | 4/1869 | Buchanan | 280/28.11 |
| 245,571 | 8/1881 | Shepard | 280/28.11 |
| 1,330,644 | 2/1920 | Matson | 280/14.2 |
| 1,477,513 | 12/1923 | McNeill | 280/14.2 |
| 1,524,850 | 2/1925 | Van Daam | 280/14.3 |
| 1,644,623 | 10/1927 | Ahn | 280/14.2 |
| 1,945,170 | 1/1934 | Wetzel | 280/23 |
| 2,101,229 | 12/1937 | Anderson et al. | 280/16 |
| 2,256,203 | 9/1941 | Hylan | 280/23 |
| 2,292,891 | 8/1942 | Moerlins | 280/23 |
| 2,513,199 | 1/1950 | Ohlhaver | 280/16 |
| 2,593,974 | 4/1952 | Brown | 280/21 |
| 2,865,032 | 12/1958 | Moody, Jr. | 280/280 |
| 2,894,760 | 7/1959 | Kolstad | 280/14.2 |
| 3,203,706 | 8/1965 | Boyden | 280/14.2 |
| 3,269,742 | 8/1966 | Funyak et al. | 280/14.2 |
| 3,529,847 | 9/1970 | Shores | 280/12 |
| 5,351,975 | 10/1994 | Petoud | 280/14.3 |
| 5,516,126 | 5/1996 | Myers | 280/14.3 |
| 5,580,078 | 12/1996 | Vance | 280/14.2 |

*Primary Examiner*—Lanna Mai
*Assistant Examiner*—Jeffrey J. Restifo
*Attorney, Agent, or Firm*—Daniel McCarthy

[57] ABSTRACT

A snow scooter is disclosed. The scooter has elongate board upwardly curved at one or both ends. A receptacle is formed in the board to placement of a steering and braking mechanism therein. A steering and braking handle projects upwardly from the steering and braking mechanism and is used to move the steering and braking mechanism in all 3 directions. A rudder or fin is located at the bottom of the steering and braking mechanism and projects downwardly into the snow. The rudder or fin is turned when the steering and braking handle is turned, effecting steering of the snow scooter. The steering and braking handle may also be angularly moved with respect to the board longitudinal axis in order to cause the control disk to project downwardly from the board bottom into the snow in order to cause braking. Steering and braking may be effected simultaneously from a single handle for a snow scooter that provides ultimate maneuverability and ease of use.

19 Claims, 7 Drawing Sheets

SNOW SCOOTER

CLAIM FOR PRIORITY

Priority is hereby claimed to U.S. Provisional Patent Application No. 60/081,907 filed on Apr. 16, 1998.

BACKGROUND OF THE INVENTION

1. Field of the Invention

The invention relates to the field of devices which a user can ride downhill on snowy or icy surfaces. More particularly, the invention relates to elongate board devices on which a user will stand to travel downhill on snow, the board having a generally vertical handle to be held by the user's hands, the bottom of the handle having a steering fin that projects beyond the underside of the board and into the snow such that as the user turns the handle, the steering fin's position is changed with respect to the longitudinal axis of the board, causing a directional change of the board and user to occur. Further, the vertical handle is movable in all three directions for ultimate maneuverability. As the vertical handle is moved toward the front or rear of the board, the control disk projects into the snow beneath the board causing a braking effect. Thus, with this invention a user can steer and brake simultaneously by using a simple vertical handle. Use of a single vertical handle to perform both steering and braking functions makes the invention easier, more efficient and more fun to use than prior art devices.

2. The Background Art

In the prior art, there have been numerous devices which a user can ride down a snowy or icy surface. The most popular of these include skis and snowboards. There has also been some work done concerning devices which a user would ride in a standing position and which have a handle for the user to grasp.

In U.S. Pat. No. 1,524,850, issued in the name of G. Van Dam on Feb. 3, 1925, a snow skate is disclosed that is intended to have one foot placed upon it and the other foot used to push the user along on the skate.

In U.S. Pat. No. 1,945,170, issued in the name of F. A. Wetzel on Jan. 30, 1934, a snow scooter is disclosed that has a supporting runner and a movable guide runner separately located in front of the supporting runner, the guide runner being operable through a steering post. The device is intended to have one foot placed on the supporting runner while using the other foot to propel himself across a snowy surface.

In U.S. Pat. No. 2,101,229, issued in the name of R. O. Anderson et al. on Dec. 7, 1937, an ice or snow scooter is disclosed having a ski portion, a guiding portion, the front of the ski portion with a guiding portion attached to it being movable right or left.

In U.S. Pat. No. 2,256,203, issued in the name of R. R. Hylan on Sep. 16, 1941, a scooter ski is disclosed having front and rear ski runners and a steering post member.

In U.S. Pat. No. 2,292,891, issued in the name of W. F. Moerlins on Aug. 11, 1942, a snow scooter is disclosed having steering and braking mechanisms.

In U.S. Pat. No. 2,513,199, issued in the name of G. J. Ohlhaver on Jun. 27, 1950, a scooter is disclosed having a ski runner, a portion of which is steerable for directional control.

In U.S. Pat. No. 2,593,974, issued in the name of R. P. Brown on Apr. 22, 1952, a ski sled is disclosed that has a pair of interconnected skis with steering and braking arrangements. Optional seating is provided.

In U.S. Pat. No. 3,539,847, issued in the name of R. F. Shores on Sep. 22, 1970, a mono-ski is disclosed having a handlebar and a braking system operable from the handle bar.

In U.S. Pat. No. 5,351,975 issued on Oct. 4, 1994 in the name of F. Petoud, a sliding apparatus for snow sports is disclosed that has a steering skid, a bearing ski and a handle for steering.

In U.S. Pat. No. 5,516,126 issued on May 14, 1996 in the name of J. D. Myers, a snow or ski runner is disclosed having a user standing area, a movable handle, and foot-activated braking and steering mechanisms.

SUMMARY OF THE INVENTION

It is an object of the invention to provide a steerable snow scooter. It is a feature of the invention that in the preferred embodiment, a snow scooter is provided that has a board, a hole in the board for a control plate, a rudder on the bottom of the control plate and a control handle on top of the control plate, so that as the control handle is rotated, the rudder turns in the snow and steers the snow scooter. It is a consequent advantage of the invention that the snow scooter may be used safely to avoid obstacles, for a greater distance on a downhill run, and with greater enjoyment than many prior art devices.

It is an object of the invention to provide a snow scooter that combines a steering and braking mechanism. It is a feature of the invention that in the preferred embodiment, the steering mechanism may be angled by the control handle to cause the control plate to project below the bottom of the board, dragging the control plate through the snow and causing a braking effect. The steering mechanism is movable in all 3 directions to provide simultaneous steering and braking. Thus, both braking and steering are performed by a single set of components.

It is an object of the invention to provide a snow play device that is lightweight, inexpensive to manufacture and easy to use. The preferred embodiment of the invention uses lightweight blow molded plastic components that are inexpensive to make. The invented snow scooter is so simple in operation that even small children and uncoordinated persons can use it successfully and with great enjoyment.

Other objects, features and advantages of the invention will become apparent to persons of ordinary skill in the art upon reading the specification and appended drawings.

DETAILED DESCRIPTION OF THE PREFERRED EMBODIMENTS

Figure 1:
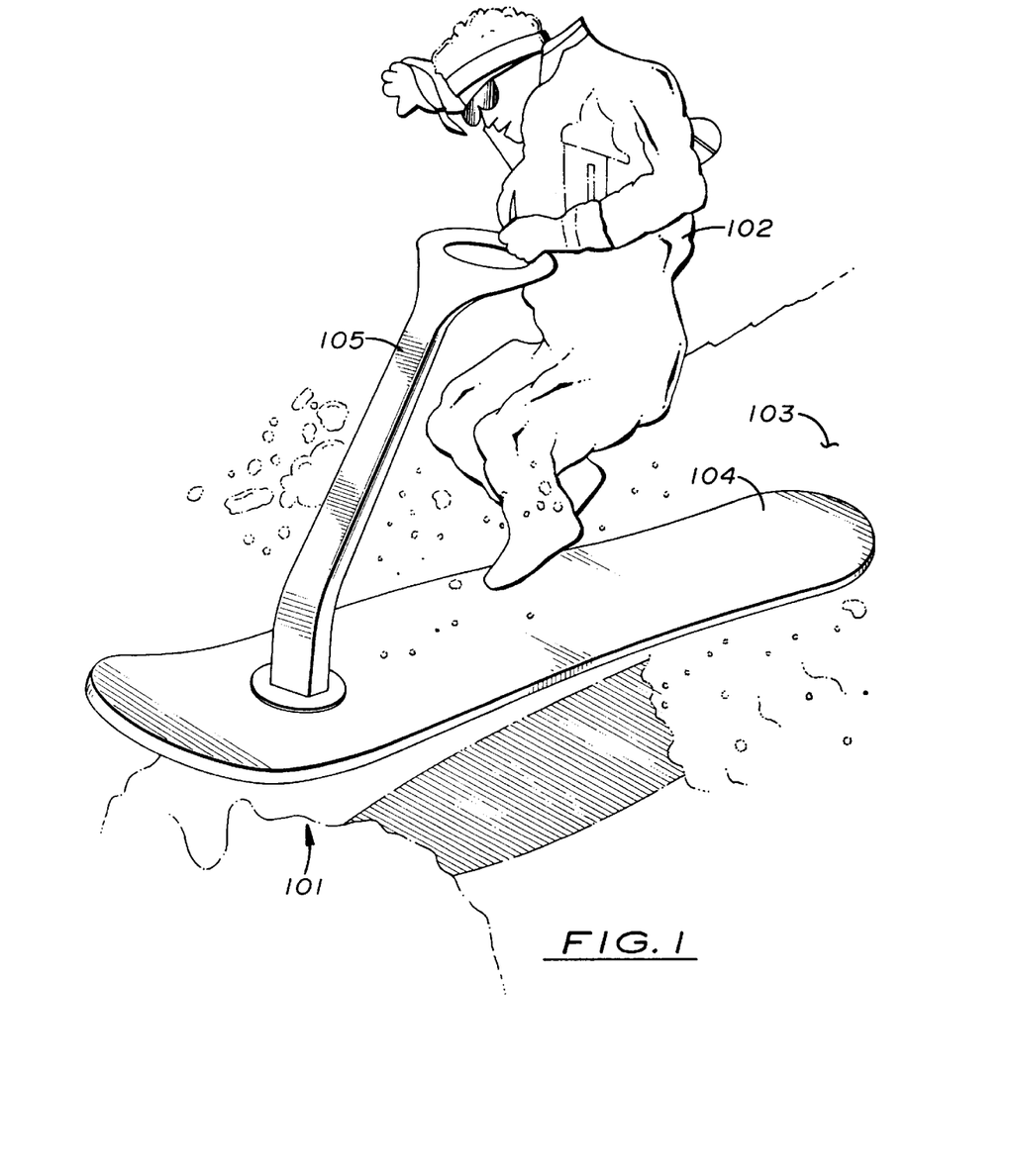
FIG. 1 depicts a user riding one embodiment of the invention down a snow-covered hill.

Referring to FIG. 1, one preferred embodiment of the invented snow scooter 101 is shown. A user 102 is shown standing on the snow scooter 101 and proceeding down a snow covered hill 103. The user 102 is standing on the scooter elongate platform 104 and is gripping the control handle 105. Because the user 102 as depicted is jumping the snow scooter off of a cliff, operation of the steering and braking mechanisms are not depicted in this figure.

Figure 2:
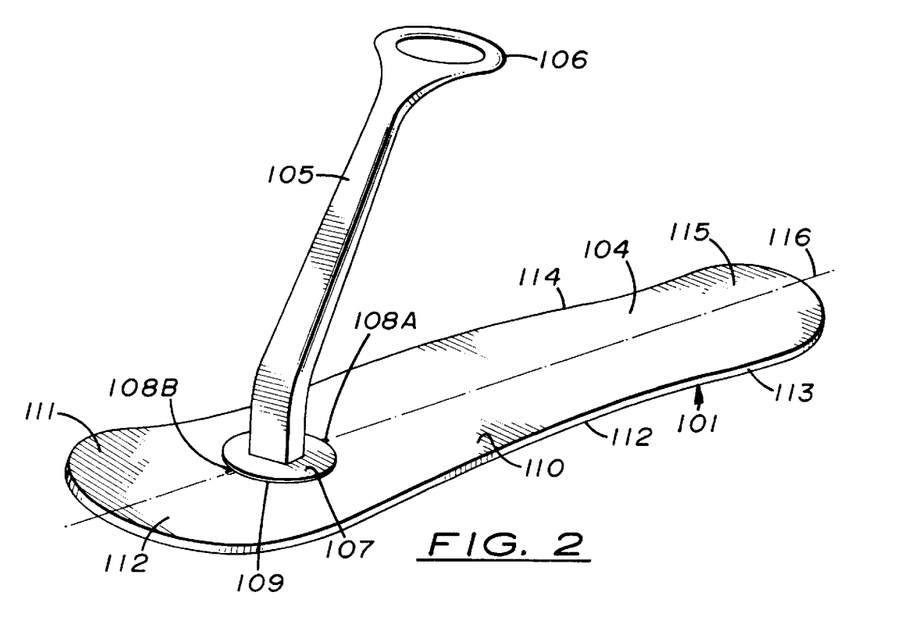
FIG. 2 shows a perspective view of one embodiment of the invention.

Referring to FIG. 2, a perspective view of the scooter 101 of FIG. 1 is depicted. The scooter 101 includes an elongate board or rider support platform 104 having a longitudinal axis 116 and a board first end 112 and a board second end 115. The board 104 has a board top 110 and a board bottom 112. At the board first end 112, an upwardly curved leading edge or upwardly curved frontal portion 111 is found. Preferably, at the board second end 115, another upwardly curved portion is also found. The board has a right side periphery 114 and a left side periphery 113 which may be straight and parallel to the axis 116, angled with resect to each other or with respect to the axis 116, or curved or otherwise non-linear. A hole 109 through the board 104 through its top 110 and through its bottom 112 serves as a receptacle for a control disk, control plate or steering mechanism 107. The hole 109 is preferably circular but may have another shape. At the outer periphery of the hole 109 are found two receptacles 108a and 108b for control rods formed or located on the control disk 107. On the top of the control disk there is a steering handle or control handle 105 with a handgrip or gripping handle 106 for a user to grasp in order to steer and brake the scooter 101. On the bottom of the control disk 107 is a fin or steering rudder (not shown). Preferably the control disk 107 and steering fin or steering rudder will be radiused to permit movement in all 3 directions within the hole 109. Movement in all 3 directions within the hole permits a user to simultaneously steer and brake the snow scooter.

Figure 3:
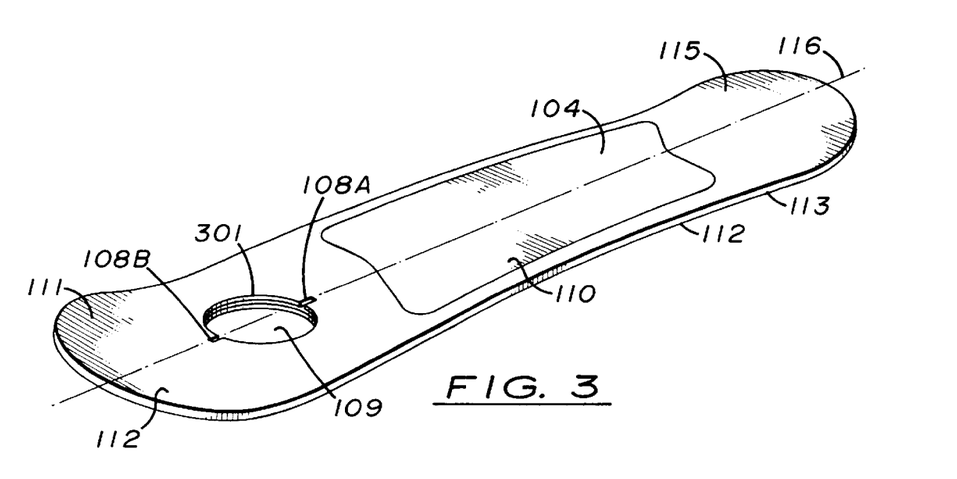
FIG. 3 shows a perspective view of one board of the invention.

FIG. 3 shows a perspective view of one embodiment of the board 104 invention. From this view, the hole 109 is clearly shown with receptacles 108a and 108b for control rods on a control disk. Note that receptacles 108a and 108b are shown as being placed along the longitudinal axis. In the hole or receptacle 109, a control rod rotation groove 301 is shown in which control rods may rotate and which allows controlled rotation of a control plate or disk place in the receptacle 109. Once a disk with control rods is place in the receptacle 109 and the control rods are placed through the receptacles 108a and 108b, the disk may be rotated, preferably 45 to 90 degrees, and the board material that forms the control rod rotation groove 301 will keep the control rods in place and prevent the control disk form engaging in unwanted movement.

Figure 4:
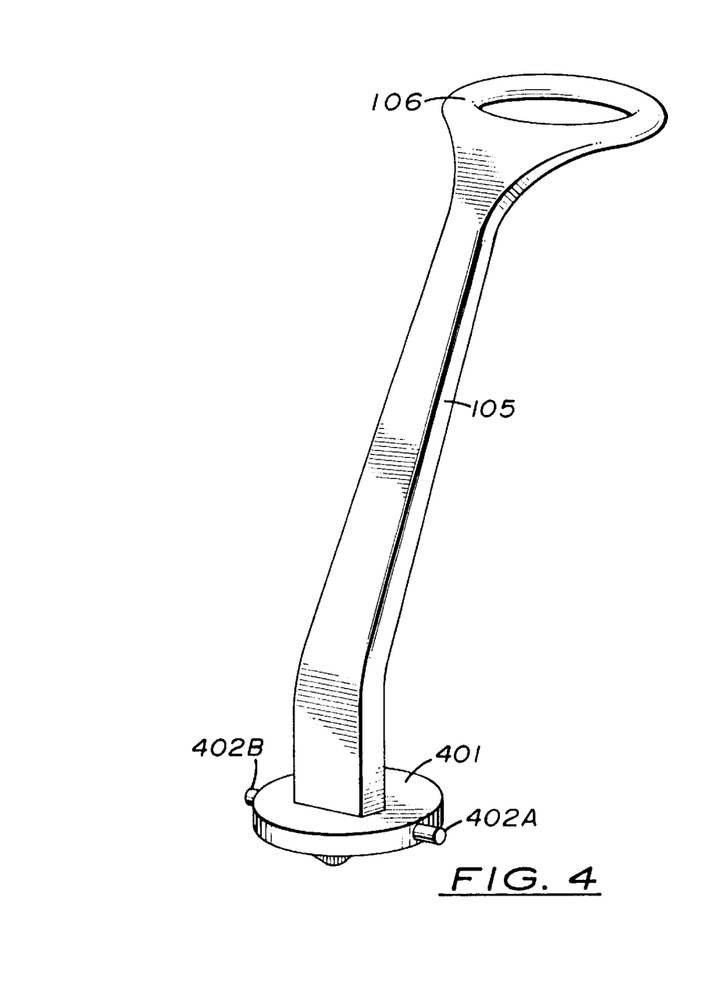
FIG. 4 shows s perspective view of one steering handle and control disk of the invention.
Figures 5, 6:
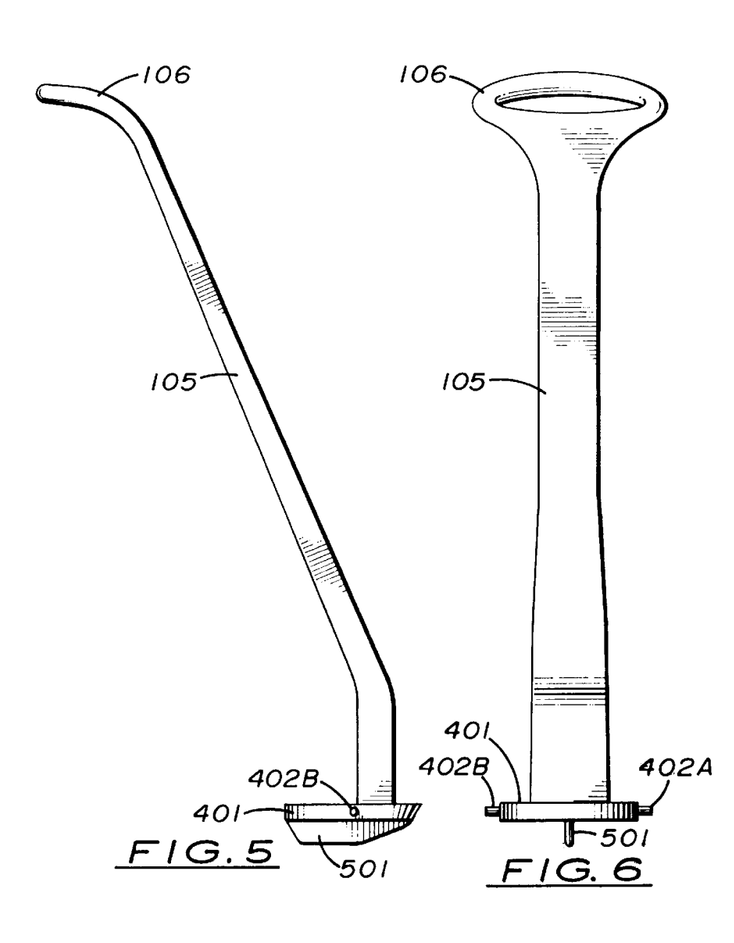
FIG. 5 shows a side view of the steering handle and control disk of FIG. 4.
FIG. 6 shows a front view of the steering handle and control disk of FIG. 4.

FIG. 4 shows a perspective view of one steering handle and control disk of the invention. FIG. 5 shows a side view of the steering handle and control disk of FIG. 4. FIG. 6 shows a front view of the steering handle and control disk of FIG. 4. Referring to these figures, a control plate or control disk or steering mechanism 401 is shown. The control disk 401 preferably has two control rods 402a and 402b on it for placement in the receptacles 108a and 108b. As explained above, once the control disk 401 is placed into receptacle 109 and rotated, the control rod rotation groove 301 will prevent the control plate 401 and handle 105 from inadvertently separating from the board 104. The control rods are preferably cylindrical in shape so that the handle 105 may be easily angularly adjusted with respect to the longitudinal axis of the board. Further, the handle 105 may be moved so that the control plate 401 moves in a direction that causes angular change of the fin or rudder 501 with respect to the board longitudinal axis. The control plate 401 and the fin or rudder 501 are preferably radiused to permit movement of the control plate 401 and fin or rudder 501 in all 3 directions. Thus, the handle 105 is moveable in all three directions to control both steering and braking simultaneously in order to achieve ultimate maneuverability. As the handle 105 is moved to cause angular adjustment of the fin 501 with respect to the longitudinal axis of the board 105, steering occurs. And as the handle 105 is moved toward the front or rear of the board 104, braking occurs. As the handle 105 is movable in all 3 directions, the handle 105 may be moved in a direction that causes (i) only steering, (ii) only braking, or (iii) simultaneous braking and steering. This provides the user with ultimate control and maneuverability of the snow scooter and results in a device that is safe, efficient and fun to use.

Figure 7:
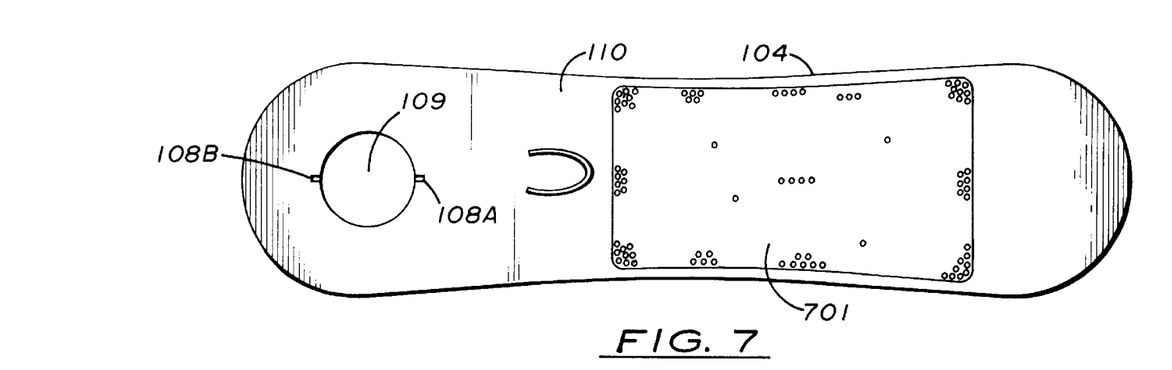
FIG. 7 shows a top view of a board of the invention.
Figure 8:
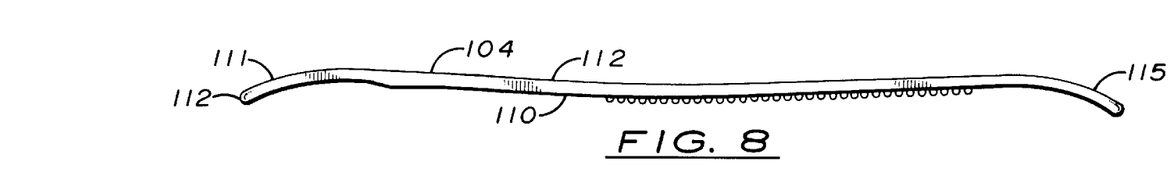
FIG. 8 shows a side view of a board of the invention.
Figure 9:
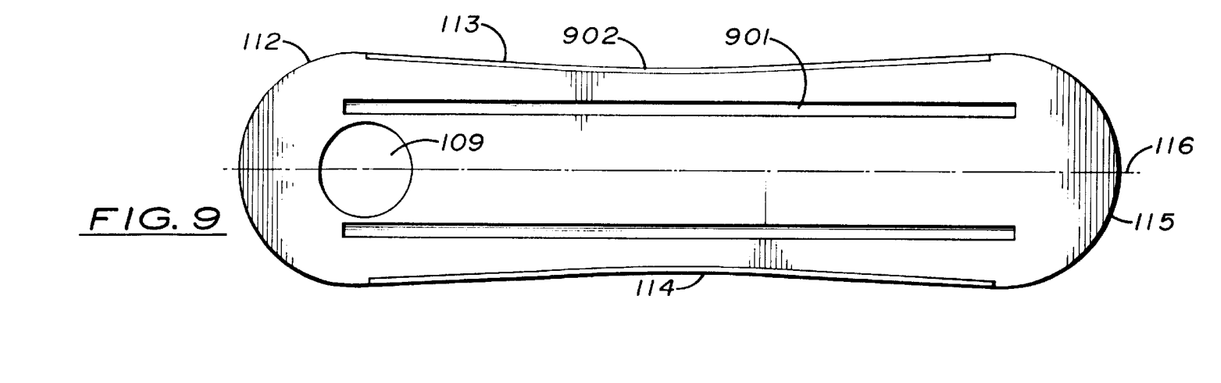
FIG. 9 shows a bottom view of a board of the invention.

FIG. 7 shows a top view of a board of the invention. FIG. 8 shows a side view of a board of the invention. FIG. 9 shows a bottom view of a board of the invention. Referring to these figures, components previously described can be seen. Also visible is a non-slip, high friction surface 701 which may include protrusions projecting from the board top 110. The surface 701 is intended to provide the user a place to firmly place his feet while using the board. Also depicted are optional metal edges 902 on the board and optional recessed channels or grooves 901 on the bottom of the board. Both the metal edges and the grooves enhance controllability of use of the board.

Figure 10:
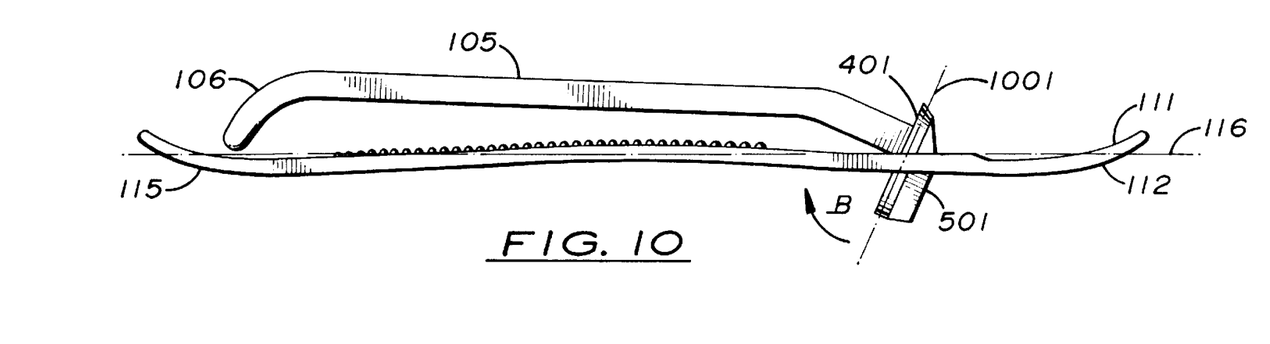
FIG. 10 shows a side view of scooter of the invention with the control handle folded onto the board for storage, transportation or extreme braking.
Figure 11:
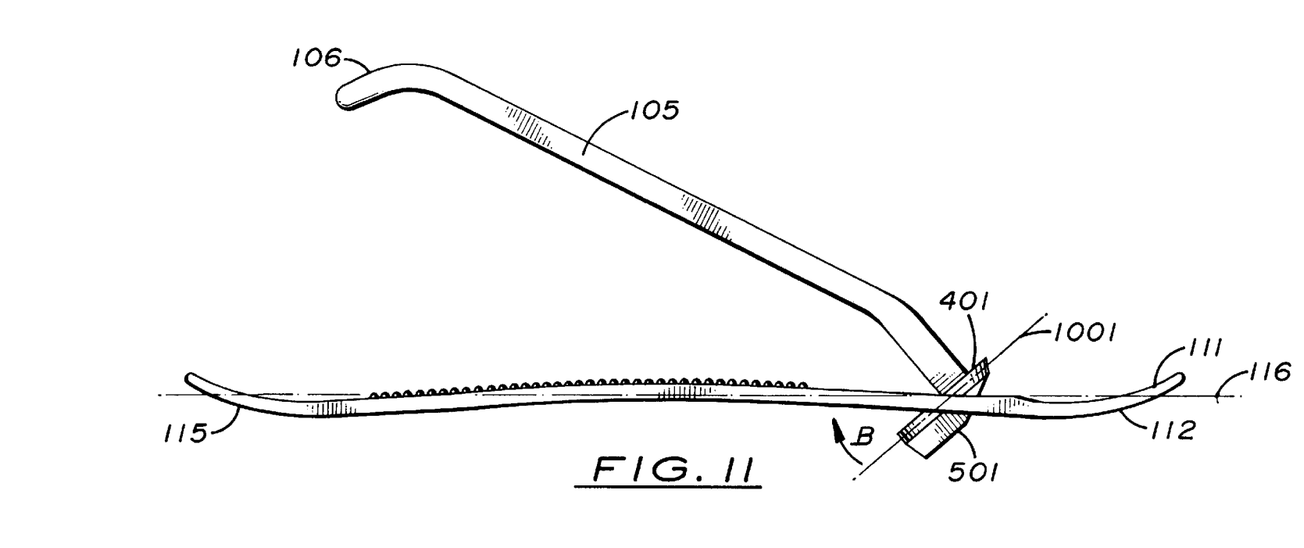
FIG. 11 shows a side view of a scooter of the invention with the handle angled for hard braking.
Figures 12, 13:
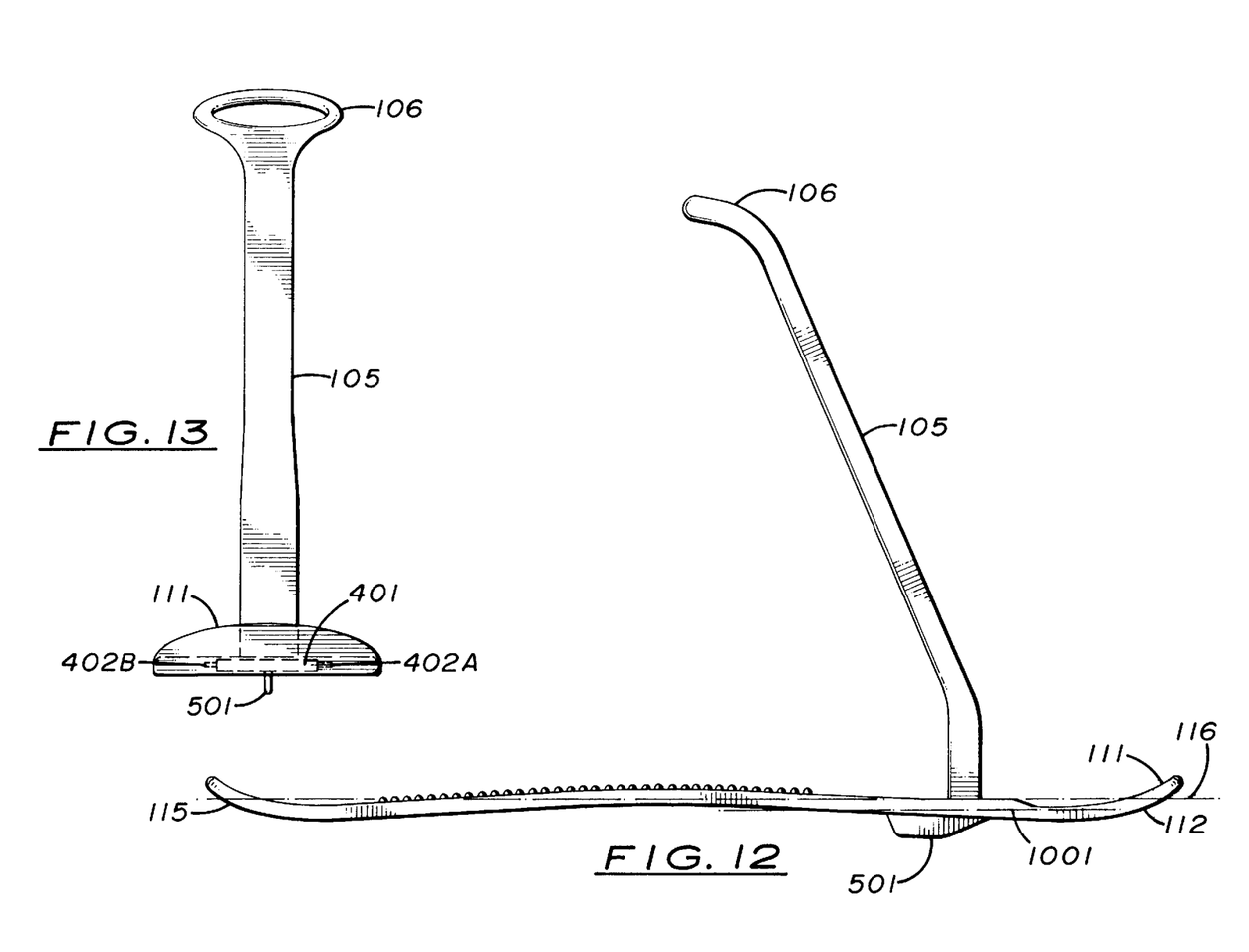
FIG. 12 shows a side view of a scooter of the invention with the handle in the position for ordinary scooting down a snow-covered hill.
FIG. 13 shows a front view of the scooter of FIG. 12.

FIG. 10 shows a side view of scooter of the invention with the control handle folded onto the board for storage, transportation or extreme braking. FIG. 11 shows a side view of a scooter of the invention with the handle angled for hard braking. FIG. 12 shows a side view of a scooter of the invention with the handle in the position for ordinary scooting down a snow-covered hill. FIG. 13 shows a front view of the scooter of FIG. 12. Referring to these figures, components previously mentioned are depicted. It can be seen that the rudder 501 has a longitudinal axis 1001 at an angle $\beta$ with the longitudinal axis 116 of the board. When braking, the angle $\beta$ can be approximately that shown in FIG. 11. When the scooter is being used for non-braking travel, the position of the control handle 105 and rudder 501 shown in FIGS. 12 and 13 is desired.

Figure 14:
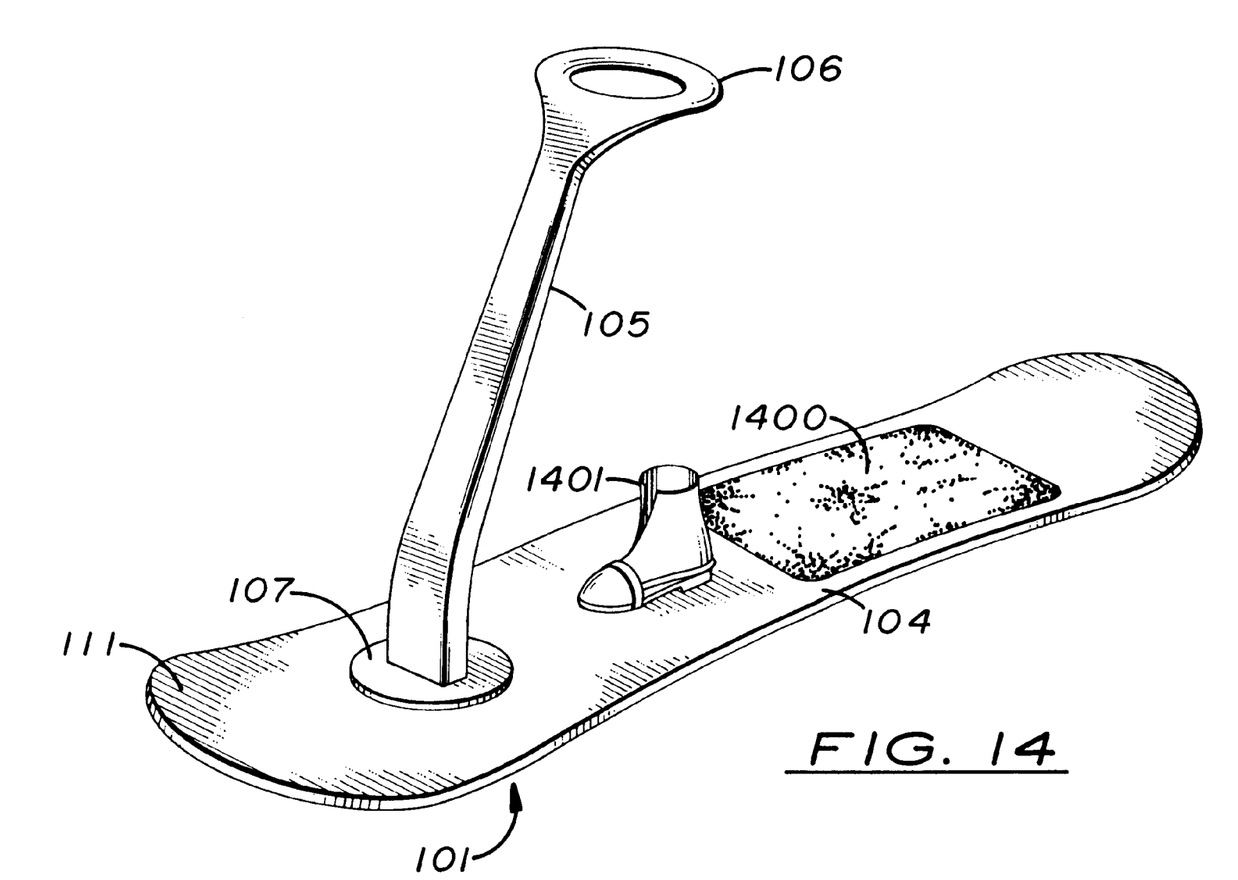
FIG. 14 depicts a view of the scooter with a boot binding.

Referring to FIG. 14, an alternative embodiment of the snow scooter with a boot binding 1401 is shown. A textured surface 1402 is provided for placement of a second foot that will not be in the binding. The boot binding allows the scooter board to be firmly attached to one foot of the user. With the control handle removed, the user can take his snow scooter on a ski lift as a snow boarder would take his board. He can then ride the snow scooter downhill with or without his foot in the binding, as desired.

To use the snow scooter, the user should select an appropriate snow-covered hill, point the first end of the elongate board down the hill and stand on the elongate board. As he moves down the hill, he may steer the scooter by turning the control handle left or right which moves the rudder left or right, causing a steering action. To brake the snow scooter, the user need only move the control handle either upward toward the board front or first end or downward toward the board rear or elongate board second end. This will cause the control disk to drag in the snow, impeding the snow scooter's travel. The more the handle is lowered, the greater the braking action. The user may also simultaneously move the handle in a direction that causes steering and in a direction that causes braking. As simultaneous steering and braking are provided, ultimate maneuverability of the snow scooter is achieved.

The snow scooter control handle is removable. To remove the handle, simply rotate the handle until the control rods line up with their receptacles, and lift the control handle, control disk and control rods out of the board. Thus disassembled, the scooter may be easily stored.

The snow scooter may be made from many materials and according to many manufacturing methods, such as blow molding high density polyethylene, injection molding plastic or fiber reinforced plastic, fiberglass, filament winding and extrusion. The snow scooter could also be made from a wood or ceramic material.

In one preferred embodiment of the invention, the board is about 50 inches long, about 14 inches wide and about 1 inch thick. Instead of the longitudinal grooves on the board, it is possible to equip the board with a rearwardly mounted downwardly projecting fin.

It should be noted that the control handle provides not only a mechanism to actuate simultaneous steering and braking of the snow scooter, it also assists the user with balance and support. This is important for novice riders and can help them acquire the skills necessary to eventually become snowboard riders.

The steering rudder or fin is preferably tapered at both of its ends as shown in the figures. Alternatively, the fin may be of other shapes or configurations.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, therefore, indicated by the appended claims rather than the foregoing description. All changes which come within the meaning and range of equivalency of the claims are to be embraced within their scope.

What is claimed is:

1. A snow scooter comprising:
    an elongate board having a first end, a second end, a top and a bottom, a left side periphery and a right side periphery, said elongate board having a longitudinal axis between its first and second ends, said elongate board being generally straight along the majority of its longitudinal axis between said first and second ends, elongate board top having a surface on which a user may stand between said first and second ends, and said elongate board bottom being a low-friction surface for sliding downhill on a snowy surface,
    an upwardly curved leading edge in the area of said elongate board first end,
    a plurality of elongate recessed channels located on said elongate board bottom, said channels being generally parallel to said elongate board longitudinal axis,
    a first metal edge located at said elongate board left side periphery and being adapted to sharply cut into snow that it contacts,
    a second metal edge located at said elongate board right side periphery and being adapted to sharply cut into snow that it contacts,
    a control plate receptacle located on said elongate board and forming a hole from said elongate board top through said elongate board to said elongate board bottom, said control plate receptacle having a periphery that is generally circular in shape,
    a first and a second control rod receiving notch located at said control plate receptacle outer periphery,
    a generally circular control plate being shaped and configured to be placed into said control plate receptacle, said control plate having a top, a bottom and an outer periphery,
    a first and a second control rod, said first and second control rods being located on said control plate outer periphery generally opposite each other, said control rods being shaped and configured to be insertable into said control rod receiving notches,
    a control rod rotation groove located about the periphery of said control place receptacle in said elongate board, said control rod rotation groove being configured and adapted to receive said control rods which have been placed into said control rod receiving notches, said control rod rotation groove permitting generally circular movement of said control rods about said control plate receptacle periphery, but said control rod rotation groove generally preventing movement of said control rods toward said elongate board top and toward except through said control rod receiving notches,
    a steering rudder having a longitudinal axis, said steering rudder being located on said control plate bottom, said steering rudder projecting from said control plate bottom below said elongate board bottom so that when said elongate board is on a snowy surface, said steering rudder projects into said snowy surface, said steering rudder being movable by rotating said control plate arcuately within said control plate receptacle so that said steering rudder longitudinal axis changes angular orientation with respect to said elongate board longitudinal axis,
    a control handle projecting upwardly from said control plate top and being configured for a snow scooter user to grasp said control handle, said control handle being movable in all 3 directions in order to cause said control plate to experience (i) arcuate movement within said control plate receptacle thereby causing said steering rudder longitudinal axis to change angular orientation with respect to said elongate board longitudinal axis and thereby provide a steering function, (ii) planar divergence from said board bottom in order to provide a braking function, and (iii) simultaneous steering and braking.

2. A snow scooter as recited in claim 1 further comprising a non-slip surface on said elongate board top on which a user may stand.

3. A snow scooter as recited in claim 1 further comprising a handgrip on said control handle, said handgrip being shaped for a snow scooter user to grasp.

4. A snow scooter as recited in claim 1 wherein said snow scooter elongate board is made from a polymer material.

5. A snow scooter as recited in claim 4 wherein said snow scooter elongate board is blow molded.

6. A snow scooter as recited in claim 1 wherein said control handle has a longitudinal axis, and wherein said control handle is movable so that said control handle longitudinal axis changes angular orientation with respect to said elongate board longitudinal axis.

7. A snow scooter as recited in claim 6 wherein moving said control handle such that a change in angular orientation between said control handle longitudinal axis and said elongate board longitudinal axis causes a change in angular orientation between said rudder longitudinal axis and said elongate board longitudinal axis.

8. A snow scooter as recited in claim 7 wherein said control handle may be moved in a manner that causes a change in angular orientation between said control handle longitudinal axis and said elongate board longitudinal axis and to such an extent that least a portion of said control plate projects below said elongate board bottom such that it will cause a braking effect against a snowy surface.

9. A snow scooter as recited in claim 1 wherein said control rod receiving notches are generally aligned with said elongate board longitudinal axis.

10. A snow scooter comprising:
- an elongate board having a first end, a second end, a top and a bottom, a left side periphery and a right side periphery, said elongate board having a longitudinal axis between its first and second ends, said elongate board top having a surface on which a user may stand between said first and second ends, and said elongate board bottom being adapted for sliding downhill on a snowy surface,
- an upwardly curved section of said elongate board, said upwardly curved section being located in the vicinity of said elongate board first end,
- a control disk receptacle located on said elongate board and forming a hole from said elongate board top through said elongate board to said elongate board bottom, said control disk receptacle having an outer periphery on said elongate board,
- at least one control rod receptacle located at said control disk receptacle outer periphery,
- a control disk installable in said control disk receptacle, said control disk having a top, a bottom and an outer periphery,
- at least one control rod, said control rod being located on said control disk outer periphery, said control rod being insertable into said control rod receptacle,
- a control rod rotation groove located about the periphery of said control disk receptacle in said elongate board, said control rod rotation groove being configured and adapted to receive a control rod, said control rod rotation groove permitting generally arcuate movement of said control rod about said control disk receptacle periphery, but said control rod rotation groove generally preventing movement of said control rod toward said elongate board top and toward said elongate board bottom except through said control rod receptacle,
- a fin having a longitudinal axis, said fin being located on said control disk bottom, said fin projecting from said control disk bottom below said elongate board bottom so that when said elongate board is on a snowy surface, said fin projects into said snowy surface, said fin being movable by rotating said control disk within said control disk receptacle so that said fin longitudinal axis changes angular orientation with respect to said elongate board longitudinal axis,
- a control handle projecting upwardly from said control disk top and being configured for a snow scooter user to grasp said control handle, said control handle being movable to cause said control disk to experience movement within said control disk receptacle thereby causing said fin and said fin longitudinal axis to change angular orientation with respect to said elongate board longitudinal axis in order to perform a steering function, and said control handle being movable to cause said control disk to experience planar divergence with respect to said elongate board bottom in order to perform a braking function, and said control handle being movable in 3 directions so tha both steering and braking functions may be performed simultaneously.

11. A snow scooter as recited in claim 10 further comprising a high friction surface on said elongate board top on which a user may stand.

12. A snow scooter as recited in claim 10 further comprising a plurality of protrusions projecting from said elongate board top, said protrusions being intended for a snow scooter user to stand thereon and to provide firm footing for the user on said elongate board top.

13. A snow scooter as recited in claim 10 wherein said snow scooter elongate board is made from polyethylene.

14. A snow scooter as recited in claim 10 wherein said snow scooter elongate board is blow molded.

15. A snow scooter as recited in claim 10 wherein said control handle, said control disk and said fin are turnable about a generally vertical axis that is generally orthogonal to said elongate board longitudinal axis in order to steer the snow scooter during use.

16. A snow scooter as recited in claim 10 wherein said control handle, said control disk and said fin are angularly adjustable with respect to said elongate board longitudinal axis in order to cause said control disk to project downward below said elongate board bottom in order to effect braking of the snow scooter during use.

17. A snow scooter comprising:
- a rider support platform having a first end, a second end, a top and a bottom, a left side periphery and a right side periphery, said platform having a longitudinal axis between its first and second ends, said platform having a surface on which a user may stand and be supported between said first and second ends,
- an upwardly curved frontal portion of said platform, said upwardly curved portion being located in the vicinity of said platform first end and said upwardly curved frontal portion of said platform being adapted to permit said platform to slid downhill on a snowy surface with minimal impedance,
- a steering and braking mechanism receptacle located on said platform in a area other than on said upwardly curved frontal portion, said steering mechanism receptacle forming a hole from said platform top through said platform to said platform bottom, said steering mechanism receptacle,
- a steering and braking mechanism installable in said steering mechanism disk receptacle, said steering mechanism having top, a bottom and an outer periphery,
- a steering rudder located on said steering mechanism bottom, said steering rudder projecting from said steering mechanism bottom below said elongate board bottom so that when said elongate board is on a snowy surface, said steering rudder projects into said snowy surface, a steering and braking handle projecting upwardly from said steering and braking mechanism top and being configured for a snow scooter user to grasp said steering and braking handle, turn said steering and braking handle with respect to said platform longitudinal axis, cause said steering and braking mechanism and said steering rudder to move with respect to said platform longitudinal axis, and consequently to steer the snow scooter, and said steering and braking handle being configured for a snow scooter user to grasp said steering and braking handle, move said steering and braking handle toward said rider support platform first end or second end, causing said steering mechanism to project below said rider support platform bottom in order to cause braking of the snow scooter, a projection emanating from a location on said steering mechanism outer periphery, and a projection receptacle in said platform adjacent said steering mechanism receptacle, said projection receptacle being capable of receiving said projection and permitting movement of said projection in said receptacle generally in the same plane as said platform;

wherein when said projection is installed in said projection receptacle, it serves to prevent said steering mechanism from coming out of said steering mechanism receptacle.

18. A snow scooter as recited in claim 17 further comprising:

a plurality of grooves located on said platform bottom, said grooves serving to provide said platform with stability and maneuverability during use.

19. A snow scooter as recited in claim 17 wherein at least one of said platform left side periphery and right side periphery is non-linear.

* * * * *